US012696246B2

(12) United States Patent
Ly et al.

(10) Patent No.: US 12,696,246 B2
(45) Date of Patent: Jul. 28, 2026

(54) MULTIPLEXING SYNCHRONIZATION SIGNAL BLOCKS IN FREQUENCY

(71) Applicant: QUALCOMM Incorporated, San Diego, CA (US)

(72) Inventors: Hung Dinh Ly, San Diego, CA (US); Yu Zhang, San Diego, CA (US); Krishna Kiran Mukkavilli, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 573 days.

(21) Appl. No.: 18/165,755

(22) Filed: Feb. 7, 2023

(65) Prior Publication Data
US 2024/0267896 A1 Aug. 8, 2024

(51) Int. Cl.
*H04W 72/0446* (2023.01)
(52) U.S. Cl.
CPC ............................... *H04W 72/0446* (2013.01)
(58) Field of Classification Search
CPC ................................................ H04W 72/0446
USPC ......................................................... 370/336
See application file for complete search history.

(56) References Cited

U.S. PATENT DOCUMENTS

| | | | |
|---|---|---|---|
| 2019/0058538 A1 | 2/2019 | Sun et al. | |
| 2022/0086852 A1 | 3/2022 | Pezeshki et al. | |
| 2022/0210844 A1* | 6/2022 | MolavianJazi | ....... H04L 5/0053 |
| 2023/0027953 A1* | 1/2023 | Palle Venkata | ....... H04W 48/02 |
| 2023/0299923 A1* | 9/2023 | Yoon | ......................... G01S 5/14 |
| | | | 370/329 |
| 2023/0345390 A1* | 10/2023 | Yin | .................... H04B 7/15528 |
| 2023/0413200 A1* | 12/2023 | Nilsson | ................ H04B 7/0408 |
| 2025/0175298 A1* | 5/2025 | Feng | ....................... H04L 5/005 |

OTHER PUBLICATIONS

Partial International Search Report—PCT/US2024/010716—ISA/EPO—May 7, 2024.
International Search Report and Written Opinion—PCT/US2024/010716—ISA/EPO—Jun. 28, 2024.

* cited by examiner

*Primary Examiner* — Faisal Choudhury
(74) *Attorney, Agent, or Firm* — Patterson + Sheridan, L.L.P.

(57) ABSTRACT

Certain aspects of the present disclosure provide a method of wireless communication at a network entity, comprising transmitting, in different time periods, different subsets of a set of synchronization signal blocks (SSBs), wherein SSBs within a subset are transmitted using frequency division multiplexing and applying different spatial filtering to different SSBs of a subset transmitted in a same time period.

18 Claims, 16 Drawing Sheets

800

Network Entity

UE

SSBs

...

802

Transmit, in different time periods, different subsets of SSBs, wherein SSBs within a subset are transmitted using frequency division multiplexing

804

Detect one of the SSBs and determine time and frequency resources of other SSBs, based on the detected SSB

PRACH

806

Perform a RACH procedure based on a suitable one of the SSBs

A method of wireless communication at a UE

Detect a SSB of a set of SSBs

1505

Measure one or more other SSBs in the set on time and frequency resources associated with the detected SSB

1510

Perform a RACH procedure based on a suitable SSB of the set of SSBs, as determined based on the detecting and measuring

1515

1500

MULTIPLEXING SYNCHRONIZATION SIGNAL BLOCKS IN FREQUENCY

BACKGROUND

Field of the Disclosure

Aspects of the present disclosure relate to wireless communications, and more particularly, to techniques for multiplexing synchronization signal blocks (SSBs) in frequency.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communication at a network entity. The method includes transmitting, in different time periods, different subsets of a set of synchronization signal blocks (SSBs), wherein SSBs within a subset are transmitted using frequency division multiplexing; and applying different spatial filtering to different SSBs of a subset transmitted in a same time period.

Another aspect provides a method of wireless communication at a user equipment (UE). The method includes detecting a SSB of a set of SSBs; measuring one or more other SSBs in the set on time and frequency resources associated with the detected SSB; and performing a random access channel (RACH) procedure based on a suitable SSB of the set of SSBs, as determined based on the detecting and measuring.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for multiplexing synchronization signal blocks in frequency.

Synchronization Signal Blocks (SSBs) are used for various purposes in wireless communications systems. As one example, a user equipment (UE) may search for SSBs when performing a cell search procedure. As another example, a UE may measure SSBs for other procedures, such as radio resource management (RRM), radio link management (RLM), or beam management.

In certain systems, it may be beneficial to transmit a relatively high number of SSBs. For example, transmitting a higher number of SSBs may help compensate for path loss associated with higher frequency ranges (FRs). SSBs may be transmitted sequentially, one SSB at a time, using time division multiplexing (TDM). Unfortunately, using TDM to transmit a high number of SSBs results in a relatively high occupancy time, which may impact system performance (e.g., increasing cell search time or increasing time to find a suitable beam).

Certain aspects of the present disclosure, however, may help reduce the amount of time needed to transmit a number of SSBs, by multiplexing SSBs in frequency. For example, in a given time period, different subsets of SSBs may be transmitted simultaneously at different frequency locations and applying different spatial filtering. As an example, by simultaneously transmitting four SSBs in this manner, the same number of SSBs may be transmitted in one quarter of the time, when compared to a time division multiplexed approach where only one SSB is transmitted at a time.

As a result, aspects of the present disclosure may allow a relatively high number of SSBs to be transmitted in a relatively short period of time. This approach may have various benefits, such as reducing cell search time or decreasing latency associated with finding a suitable beam.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
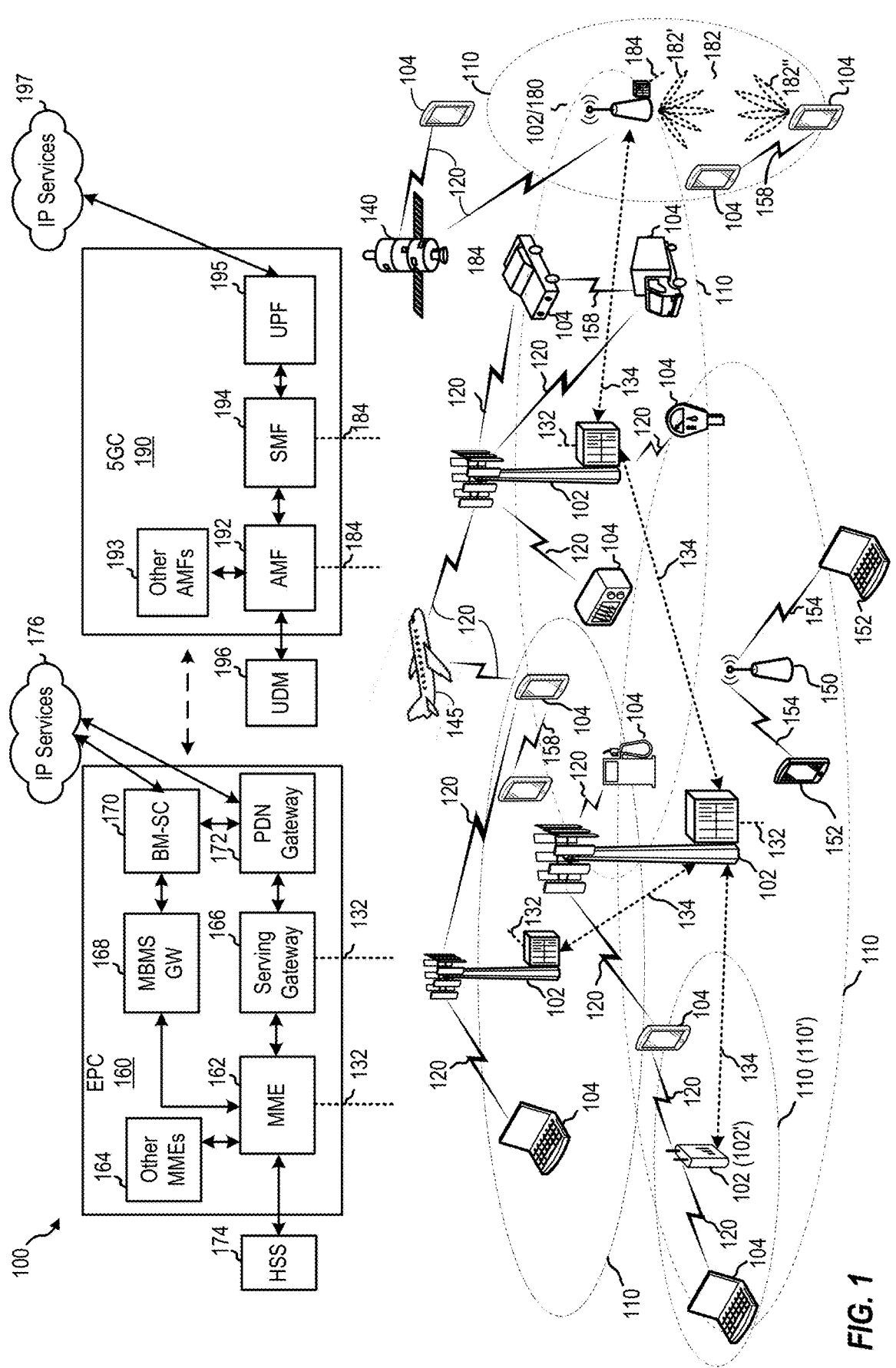
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
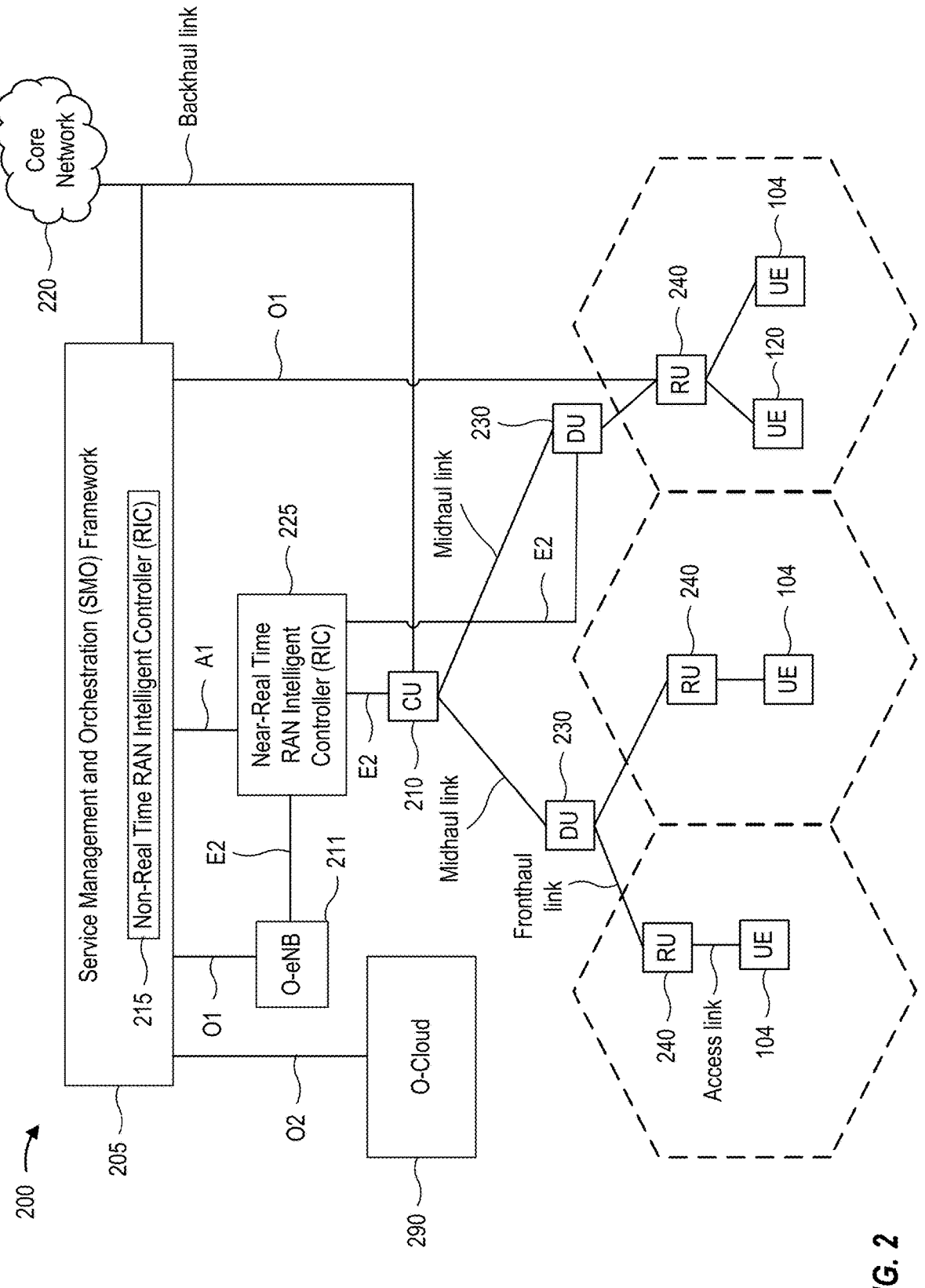
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
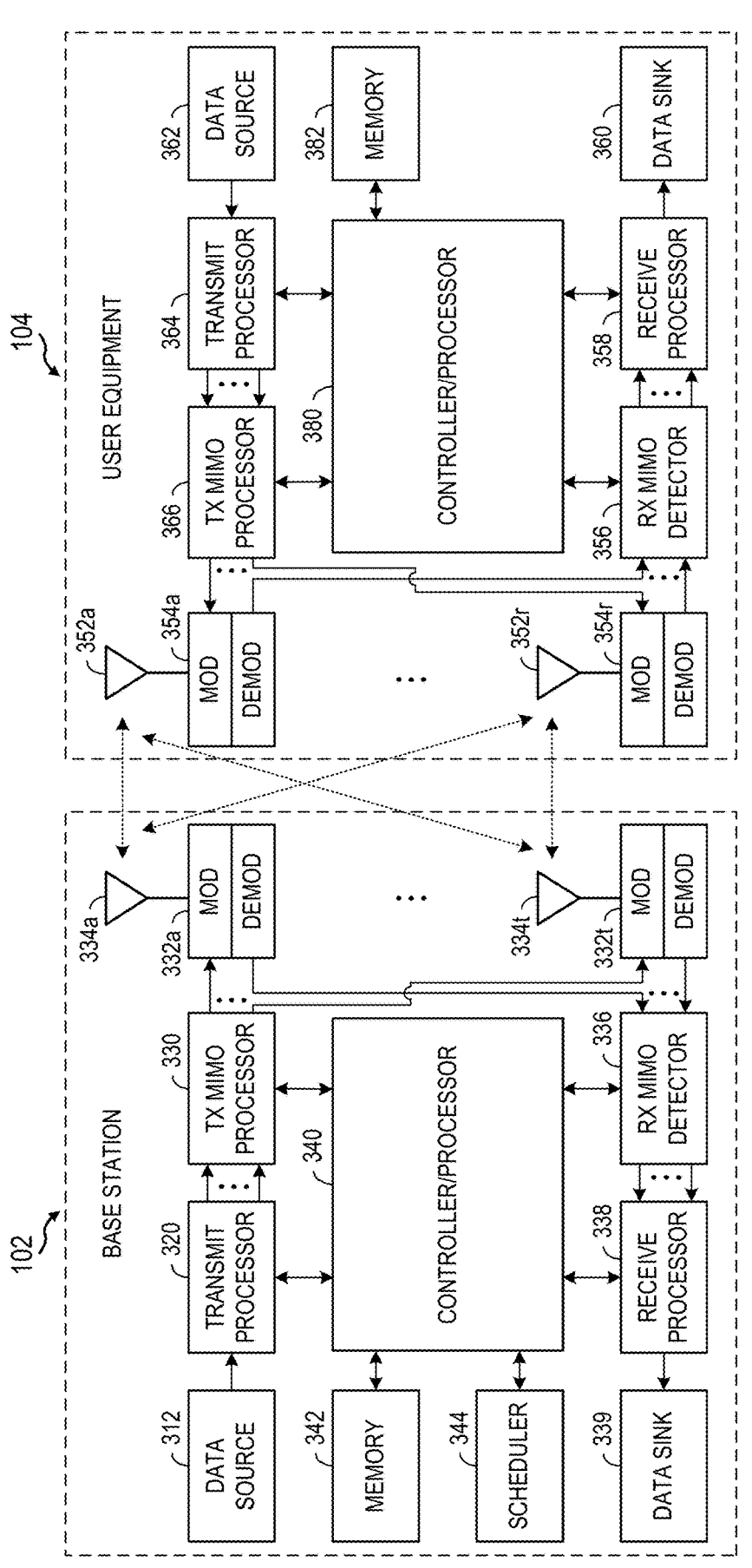
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
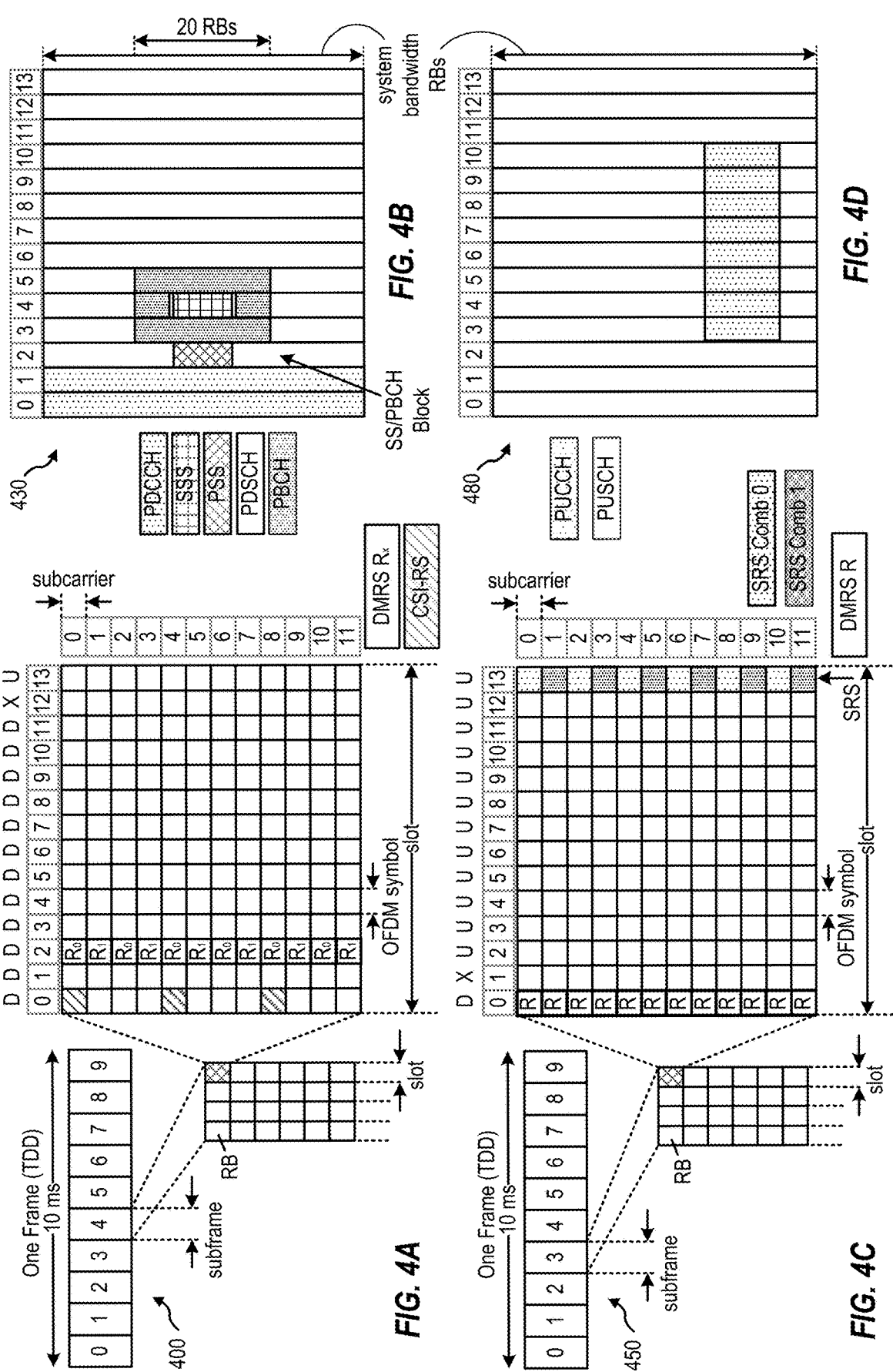
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The sub-carrier spacing and symbol length/duration are a function of the numerology. The subcarrier spacing may be equal to $2^{\mu} \times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of SSB Transmissions

As noted above, SSBs may be used for various purposes, such as performing a cell search procedure, radio resource management (RRM), radio link management (RLM), and beam management.

Figure 5:
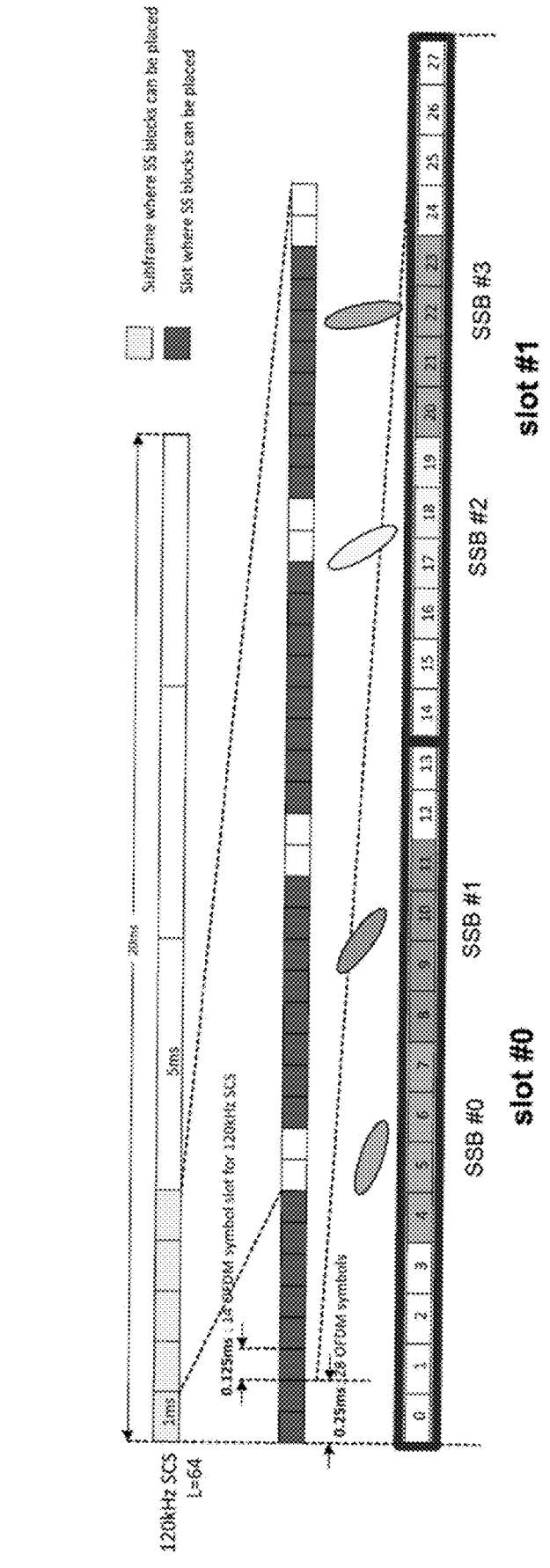
FIG. 5 illustrates example synchronization signal block (SSB) transmissions.

As illustrated in FIG. 5, SSBs may be transmitted sequentially, using time division multiplexing (TDM). In the illustrated example, an SSB pattern of 120 kHz is shown. For example, there may be up to 64 potential SSB positions in the time domain, which can be used for/correspond to 64 beam directions (spatial). As shown, each SSB (formed by four symbols) can correspond to one beam direction. This SSB pattern is often fixed and known to the connected UE, and used by the UE for measurement, e.g., when a UE is connected and wants to refine its beams, or when the UE is moved and attempts to seek better beams.

As indicated above, using TDM to transmit a high number of SSBs results in a relatively high occupancy time, which may impact system performance (e.g., increasing cell search time or increasing time to find a suitable beam).

Aspects Related to Multiplexing SSBs in Frequency

Certain aspects of the present disclosure, however, may help reduce the amount of time needed to transmit a number of SSBs, by multiplexing SSBs in frequency. As a result, aspects of the present disclosure may allow a relatively high number of SSBs to be transmitted in a relatively short period of time.

Figure 6:
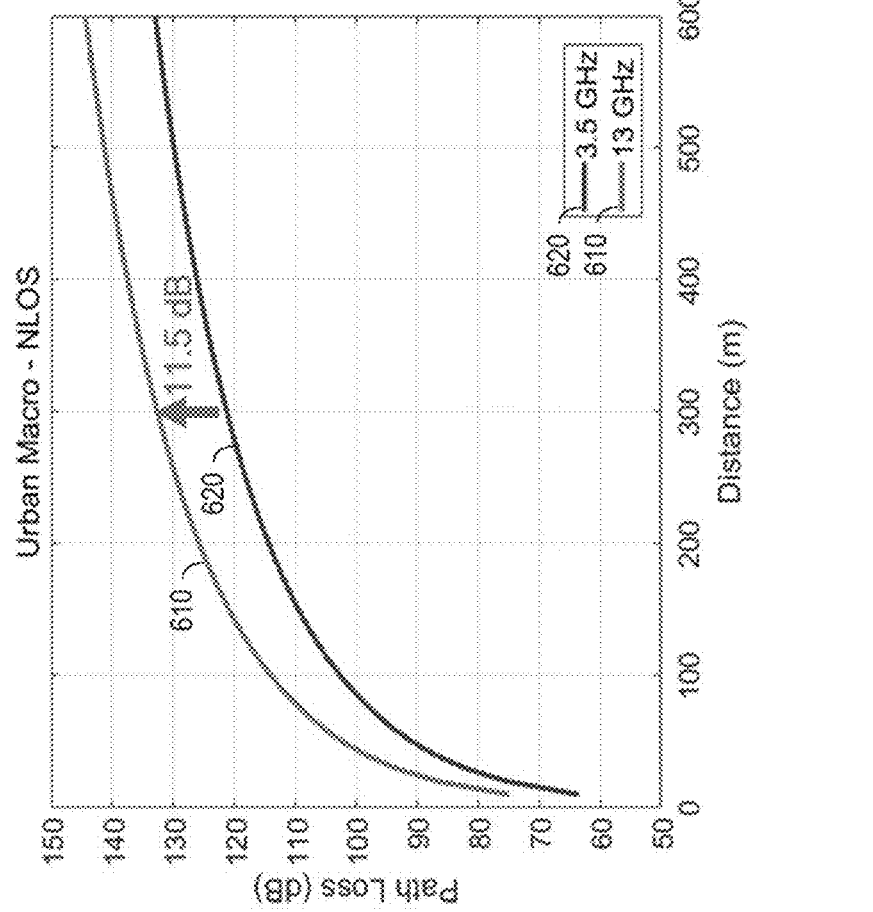
FIG. 6 depicts an example of path loss for different frequency ranges.

In some deployments, a higher number of SSBs (transmitted in different directions) may be transmitted to compensate for path loss experienced in higher frequency ranges. As illustrated in FIG. 6, wireless transmissions using a frequency in frequency range 3 (FR3, e.g., with a carrier frequency in the range of 7-16 GHZ) may experience substantially higher path loss at the same distance than wireless transmissions using a frequency in FR1. In the illustrated example, a comparison of plot 610 to plot 620 shows how an FR3 signal (13 GHZ) may have 11.5 dB more path loss than an FR1 signal (3.5 GHZ) at distances over 200 m.

FR3 signals may also experience higher outdoor-to-indoor (O2I) penetration loss. For example, depending on the material a signal is to penetrate (e.g., standard plane glass, IR reflective glass, concrete, or wood), FR3 signals may experience 6.6 dB of additional O2I loss than FR1 signals. Path loss due to distance and O2I may be cumulative, thus resulting in a total propagation loss of ~18 dB.

In some deployments, using Giga-MIMO (multiple input multiple output) antenna panels at the network side (e.g., gNB) may help overcome some of the aforementioned challenges with propagation losses (O2I and path loss). With Giga-MIMO, a gNB may increase the number of antennas to maintain a similar antenna aperture and increase antenna gain. For example, increasing the number of antennas by sixteen times may help achieve a 12 dB gain. Giga-MIMO may increase spatial multiplexing by increasing digital beamforming capabilities. At the UE-side, the number of DL/UL antennas and maximum uplink transmission power may also be increased. For example, doubling the number of antennas at the UE may help achieve a ~3 dB gain, while increasing transmission power may achieve a 3 to 6 dB gain. Higher system bandwidth (BW), for example, from 100 MHz to 500 MHz, may lead to a ~7 dB gain for downlink.

Figure 7:
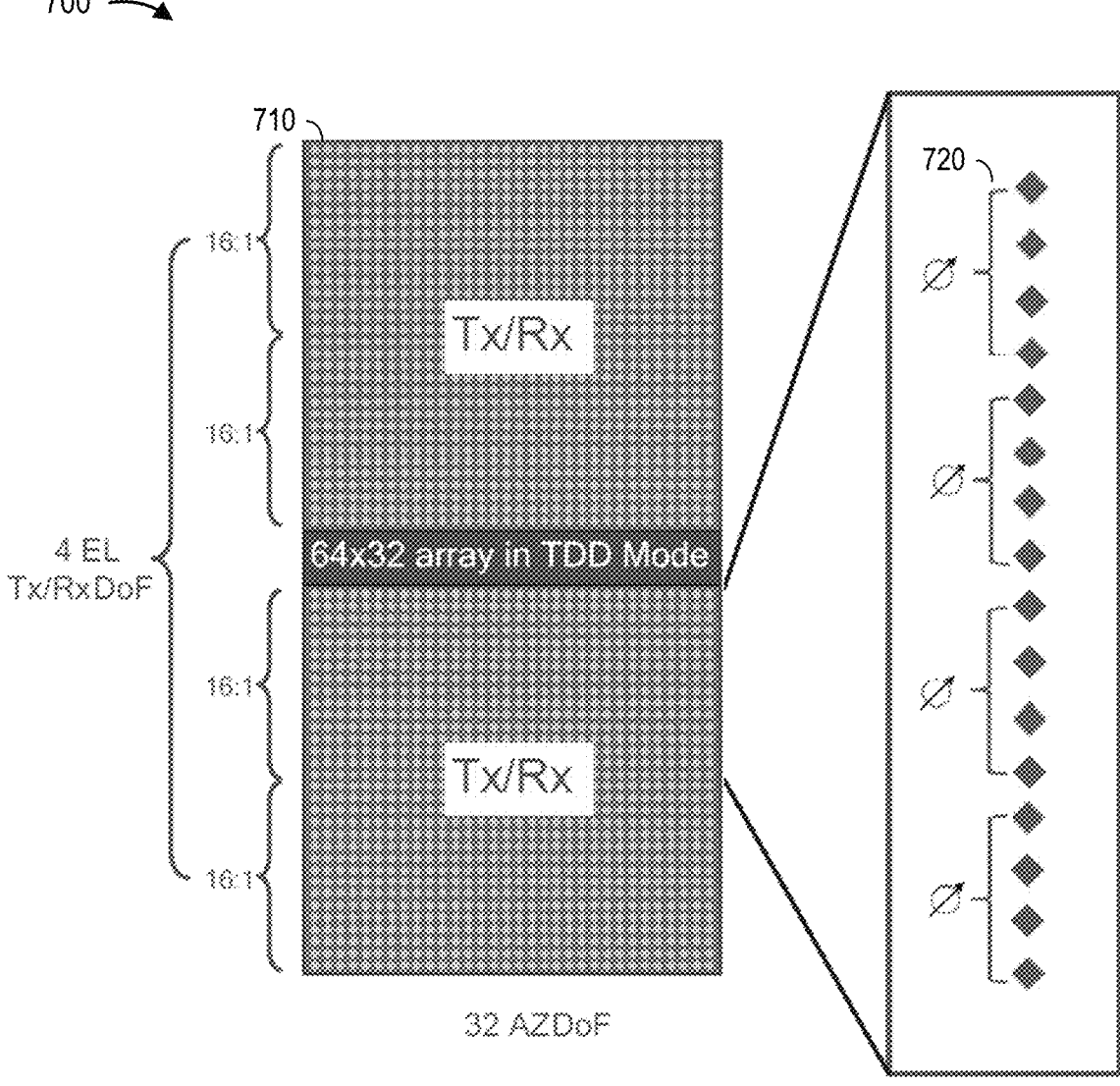
FIG. 7 depicts an example antenna configuration.

FIG. 7 illustrates one example of an antenna configuration 700, utilizing a Giga MIMO Antenna Panel, that may be utilized in FR3. The panel configuration 700 may include two panels 710, with a total of 4,096 (4K) antenna elements (e.g., 64×32×2) and 256 digital degree of freedom (DOF) transmit/receive units (TxRUs, e.g., 4×32×2). This arrangement may help enable hybrid beamforming technology, for example, with 16:1 analog combining over two stages, via 4:1 fixed combining and 4:1 programmable phasors, as shown at 720. This design may enable dynamic adaptation of combiners to improve array gain and the ability to perform extensive spatial multiplexing with singular value decomposition (SVD) and/or signal-to-leakage ratio (SLR) based digital beamforming. In a full duplex mode, two panels may be used for simultaneous Tx/Rx. For example, 2,048 (2K) antenna elements (e.g., 32×32×2) per subpanel may be mapped to 128 TxRUs (e.g., 2×32×2).

Antenna configurations shown in FIG. 7 enable the use of a higher number of beams and greater refinement in directional communications. The techniques presented herein may help support such capability by allowing a greater number of SSBs to be transmitted in a shorter period of time through the use of frequency multiplexing.

The number of SSBs transmitted in a system may depend on an operation frequency range and subcarrier spacing (SCS). For FR1, with an SCS of 15 kHz or 30 kHz, a maximum number of SSBs may be 4 (e.g., for a carrier frequency ≤3 GHz) or 8 (e.g., for a carrier frequency ≥3 GHZ). For FR2, with an SCS of 120 kHz or 240 kHz, a maximum number of SSBs may be 64. In either case, SSB may be transmitted using time division multiplexing (TDM).

For FR3, a carrier frequency in the range of 7-16 GHz with a 30 kHz SCS for SSB may be used. As noted above, to compensate for a higher path loss in FR3, a higher number of SSBs than FR1 (e.g., 16) may be used. Unfortunately, transmitting SSBs via TDM may result in a longer time occupancy than desirable (e.g., for cell searching or other purposes). For example, assuming 2 SSBs transmitted per slot, transmitting 16 SSBs would take 8 slots (e.g., 4 ms with a 30 kHz SCS).

Certain aspects of the present disclosure, however, may help reduce the amount of time needed to transmit a number of SSBs, by multiplexing SSBs in frequency. In a given time period, different subsets of SSBs may be transmitted simultaneously at different frequency locations and applying different spatial filtering.

According to certain aspects, hybrid beamforming (HBF) may be leveraged to multiplex SSBs in frequency. This approach may help achieve higher UE power savings, by reducing measurement time. This approach may also help achieve higher network power savings, by reducing SSB transmission time, particularly in empty load scenarios.

HBF generally refers to a combination of digital beamforming and analog beamforming and may help achieve a compromise between low power, but less flexible, analog beamforming and power-intensive, but more flexible, digital beamforming. As will be described in greater detail below, in some cases, different digital beamformers may be used for simultaneously transmitted SSBs multiplexed in frequency, while different analog beamformers may be used during different time periods.

Figure 8:
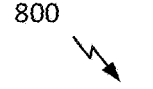
FIG. 8 depicts an example call flow diagram, in accordance with aspects of the present disclosure.

Techniques for multiplexing SSBs in frequency proposed herein may be understood with reference to call flow diagram 800 of FIG. 8. The UE and network entity depicted in FIG. 8 may be examples of UE 104 and BS 102 depicted and described with respect to FIGS. 1 and 3. The network entity may also be an example of a node of a disaggregated base station depicted and described with respect to FIG. 2.

As illustrated at 802, the network entity may transmit, in different time periods, different subsets of SSBs, wherein SSBs within a subset are transmitted using frequency division multiplexing. Each SSB may be sent in a different direction, using a different (digital/analog) beamforming. In some cases, time and frequency locations of the SSBs may be determined according to a multiplexing structure, such as that shown in FIG. 9.

The multiplexing structure may provide a relationship between time and frequency locations of SSBs with in a subset or set. The UE may, thus, first search for SSBs in different frequency locations determined by the multiplexing structure (e.g., with the distance between consecutive frequency locations defined by a synchronization raster), until one SSB is successfully detected. As illustrated at 804, after detecting one SSB, the UE may use the relationship to determine time and frequency locations of other SSBs to search for. As illustrated at 806, the UE may then perform a RACH procedure based on a suitable SSB, as determined by the search and measurement. For example, the UE may initiate the RACH procedure by sending a PRACH preamble in a RACH occasion (RO) mapped to the suitable SSB. A suitable SSB may be selected, for example, as an SSB with a strongest reference signal received power (RSRP) measurement. In some cases, an SSB may be considered suitable (only) if it has an RSRP above a threshold value (e.g., as specified by a parameter rsrp-ThresholdSSB).

Figure 9:
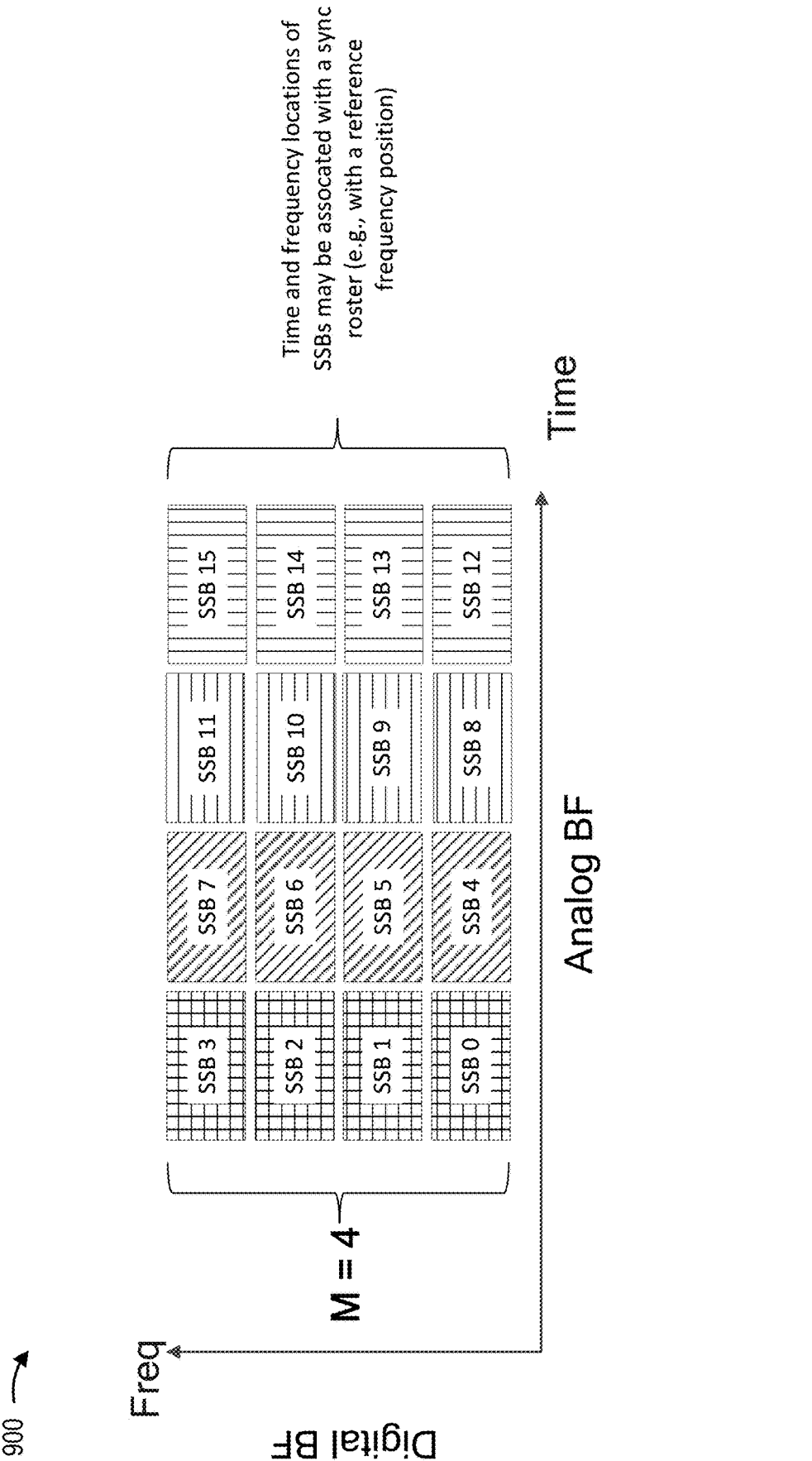
FIG. 9 depicts an example multiplexing structure for SSB transmissions.

FIG. 9 illustrates on example of a multiplexing structure 900, in which a subset of M SSBs of a larger set of N SSBs is simultaneously transmitted using FDM. In the illustrated example, M=4, N=16, such that SSB0-SSB3 are simultaneously transmitted in a first time period, SSB4-SSB7 are simultaneously transmitted in a second time period, SSB8-SSB11 are simultaneously transmitted in a third time period, and SSB12-SSB15 are simultaneously transmitted in a fourth time period. Different digital beamforming may be used within a time period, while analog beamforming may be changed across time periods, as indicated by the different cross-hatching.

In some cases, UE may be made aware of M in various manners. In some cases, the value of M may depend on a frequency range (FR) and may be fixed in a standard specification. For example, a standard specification may indicate a first value (e.g., M=1) for FR1 and/or FR2 and a second value (e.g., M=4) for FR3. As an alternative, the value of M may be indicated in an SSB (e.g., conveyed via PSS, SSS, PBCH, or any combination thereof). In some cases, there may be a limited set of candidate values of M. These candidate values of M may be different for different frequency ranges.

Figure 10:
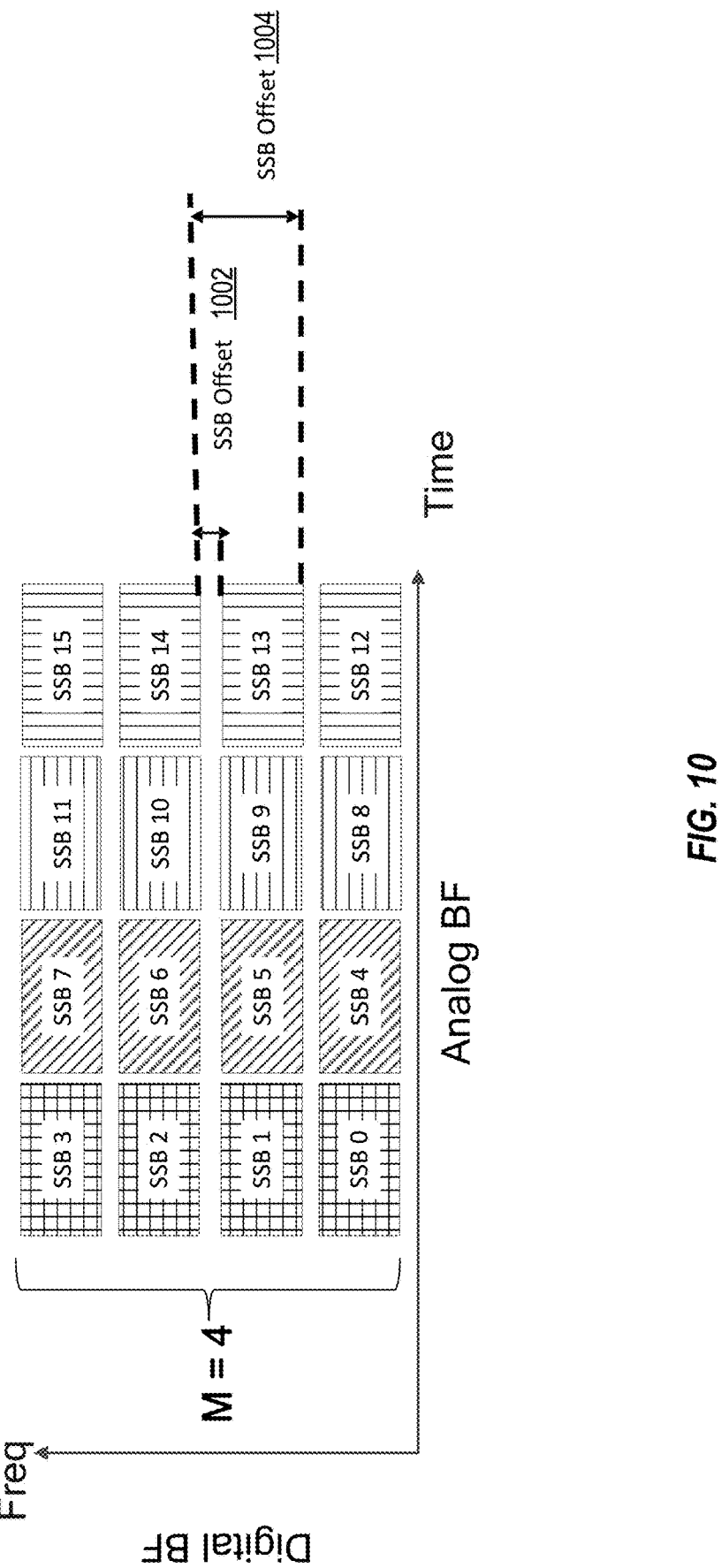
FIG. 10 depicts example SSB offsets for an example multiplexing structure for SSB transmissions.

In some cases, as illustrated in FIG. 10, the UE may be aware of a frequency offset between SSBs that are consecutive in frequency. As shown at 1002, the frequency offset between SSBs can be defined as the offset from the starting RB of the next SSB higher in frequency to the highest (last) RB of the previous SSB lower in frequency. As an alternative, as shown at 1004, the frequency offset between SSBs can be defined from the starting RB of the SSB higher in frequency to the lowest (starting) RB of the previous SSB lower in frequency. In some cases, the offset may depend on frequency range and may be defined in a standard specification. Offset values between different adjacent pairs of SSBs in frequency may be identical or different (e.g., the frequency offset between SSB1 and SSB2 could be the same or different than the frequency offset between SSB0 and SSB1).

Figure 11:
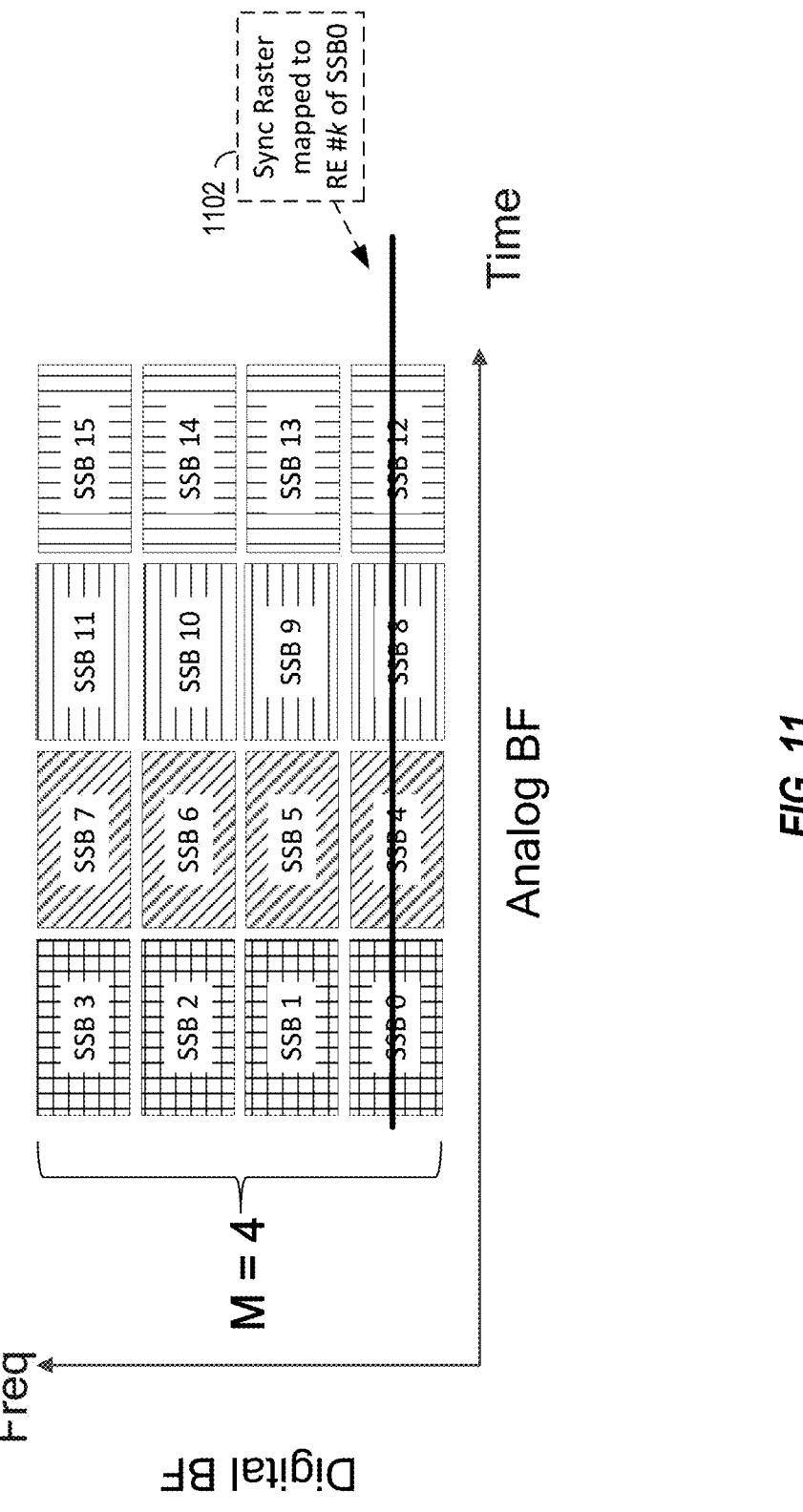
FIG. 11 depicts an example synchronization raster for an example multiplexing structure for SSB transmissions.

As illustrated in FIG. 11, in some cases, the multiplexing structure defining time and frequency locations of SSBs may be based on a synchronization (sync) raster. For example, a sync raster may define SSB frequency positions, for SSB indices, based on various Global Synchronization Channel Number (GCSN) parameters. In general, the synchronization raster indicates the frequency positions of SSB that UE can use for system acquisition, thus putting a constraint on the number of frequency positions a UE needs to search. The range of GSCNs may depend on factors, such as operating band, SSB SCS, and SSB pattern.

In some cases, to reduce search complexity, (parameters of) the sync raster may depend on the value of M. As an example, if M=4, a step size of GSCN may be N1, while the step size may be N2 (where N2<N1) if M<4.

When SSBs are transmitted using TDM only, a sync raster may map the sync raster to a kth resource element (RE) of an SSB, without the need of involving an SSB index if FDM is not used. For FDM-based SSB transmissions proposed herein, however, the UE may need to know which SSB is used for the sync raster to SSB RE mapping. Therefore, for SSB FDM proposed herein, the UE may be made aware of the SSB that the sync raster is mapped to.

For example, as illustrated in FIG. 11, the sync raster may be mapped to a particular RE of a reference SSB. In the illustrated example, as shown at 1102, the sync raster may be mapped into RE #k of SSB0. For example, if the SSBs span 20 RBs (and 240 REs), k may be equal to 120.

When SSBs are multiplexed in both time and frequency, the UE and network should be aligned regarding the order of SSB mapping to time and frequency resources.

Figure 12:
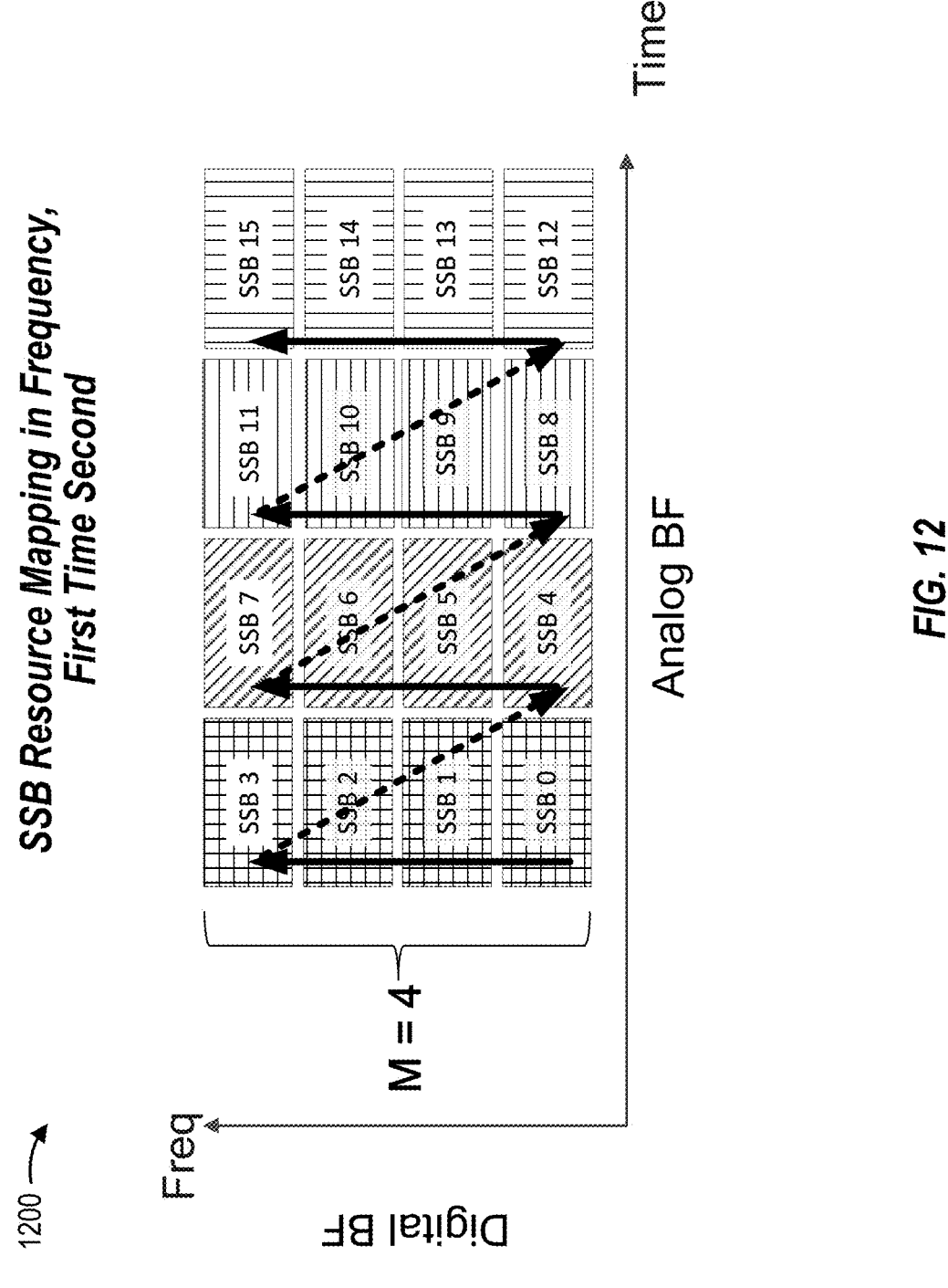
FIG. 12 depicts a first example SSB resource mapping for an example multiplexing structure for SSB transmissions.

As illustrated by the arrows in FIG. 12, SSB to resource mapping could be ordered in frequency first and then time. In the illustrated example, SSBs 0-3 are mapped in frequency first in the first time duration, then SSBs 4-7 in the second time duration, then SSBs 8-11 in the third time duration, and then SSBs 12-15 in the fourth time duration.

Figure 13:
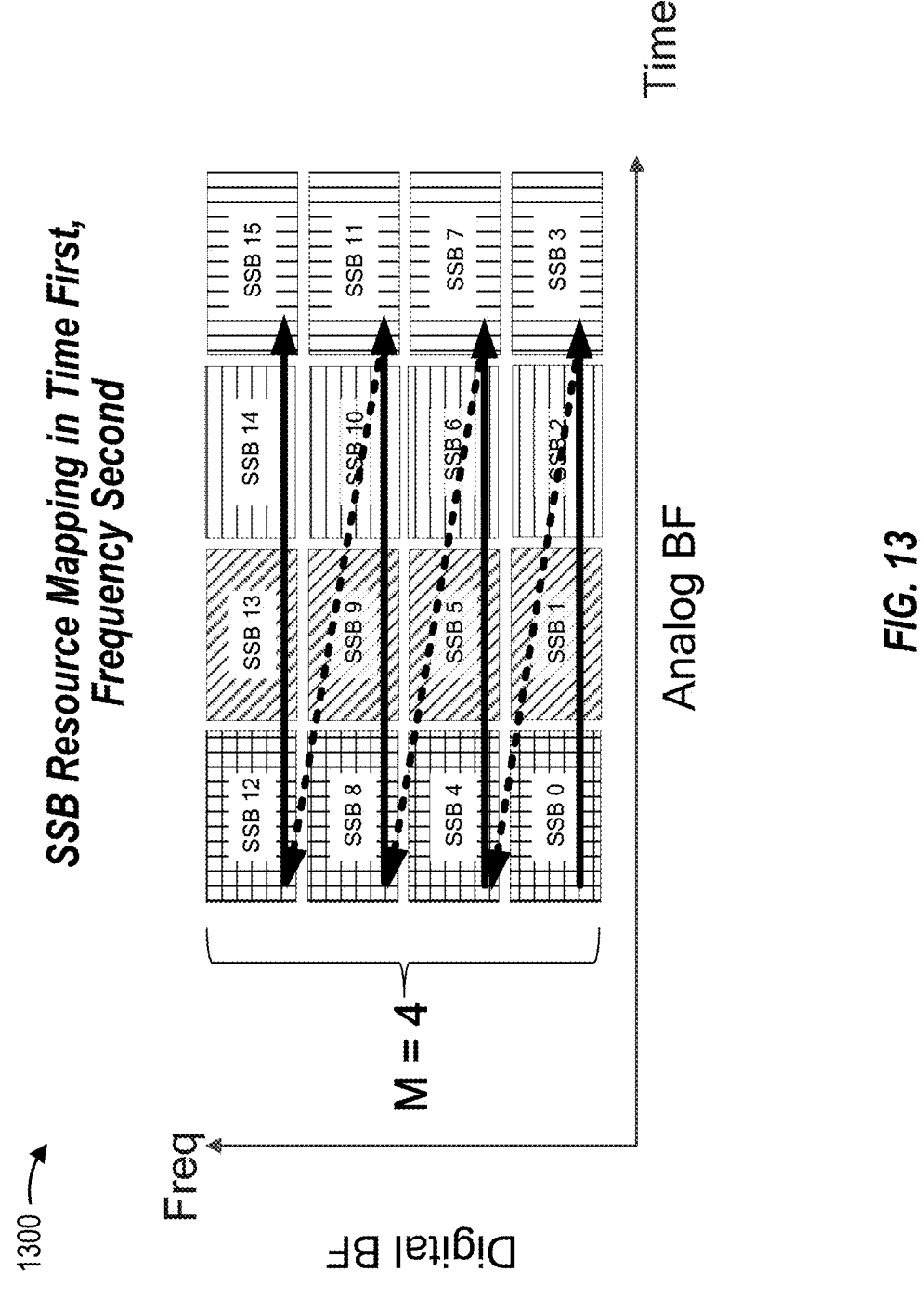
FIG. 13 depicts a second example SSB resource mapping for an example multiplexing structure for SSB transmissions.

As an alternative, as illustrated by the arrows in FIG. 13, SSB to resource mapping could be ordered in time first and then frequency. In the illustrated example, SSBs 0-3 are mapped to the same first frequency resources across the four time durations, then SSBs 4-7 are mapped to the same second frequency resources across the four time durations, then SSBs 8-11 are mapped to the same third frequency resources across the four time durations, and then SSBs 12-15 are mapped to the same fourth frequency resources across the four time durations.

As described herein, by multiplexing SSBs in frequency, aspects of the present disclosure may allow a relatively high number of SSBs to be transmitted in a relatively short period of time. This approach may have various benefits, such as reducing cell search time or decreasing latency associated with finding a suitable beam.

Example Operations

Figure 14:
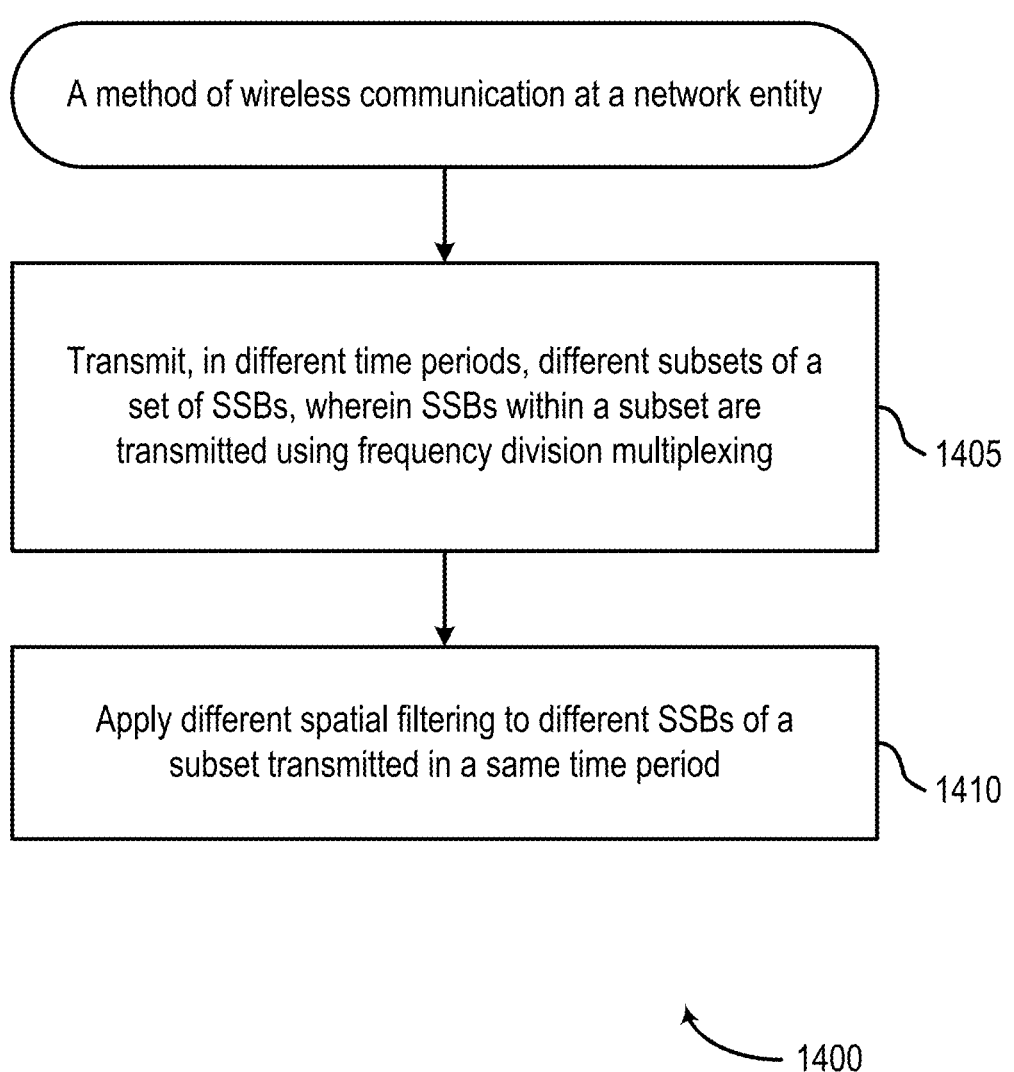
FIG. 14 depicts a method for wireless communications.

FIG. 14 shows an example of a method 1400 of wireless communication at a network entity, such as a BS 102 of FIGS. 1 and 3, or a disaggregated base station as discussed with respect to FIG. 2.

Method 1400 begins at step 1405 with transmitting, in different time periods, different subsets of a set of SSBs, wherein SSBs within a subset are transmitted using frequency division multiplexing. In some cases, the operations of this step refer to, or may be performed by, circuitry for transmitting and/or code for transmitting as described with reference to FIG. 16.

Method 1400 then proceeds to step 1410 with applying different spatial filtering to different SSBs of a subset transmitted in a same time period. In some cases, the operations of this step refer to, or may be performed by, circuitry for applying and/or code for applying as described with reference to FIG. 16.

In some aspects, applying the different spatial filtering to different SSBs of a subset transmitted in a same time period comprises: applying different digital beamforming to the different SSBs of the subset in the same time period; and applying same analog beamforming to the different SSBs of the subset in the same period.

In some aspects, the method 1400 further includes applying different analog beamforming in different time periods. In some cases, the operations of this step refer to, or may be performed by, circuitry for applying and/or code for applying as described with reference to FIG. 16.

In some aspects, a number of SSBs in a subset depends, at least in part, on a frequency range in which the set of SSBs is transmitted.

In some aspects, the method 1400 further includes indicating, in one of the set of SSBs, a number of SSBs in a subset. In some cases, the operations of this step refer to, or may be performed by, circuitry for indicating and/or code for indicating as described with reference to FIG. 16.

In some aspects, frequency positions of one or more SSBs in a subset are determined based on one or more frequency offsets relative to a frequency position of at least one other SSB in the same subset or a different subset.

In some aspects, values of the one or more frequency offsets depend, at least in part, on a frequency range in which the set of SSBs is transmitted.

In some aspects, different SSBs of a subset are transmitted, within a same time period, at frequency positions determined according to a synchronization raster.

In some aspects, one or more characteristics of the synchronization raster depend, at least in part, on a number of SSBs in a subset.

In some aspects, the one or more characteristics comprise at least one of a range or step size of the synchronization raster.

In some aspects, the synchronization raster is mapped to one of the SSBs in a subset.

In some aspects, SSBs of the set are mapped to REs in frequency and, subsequently, mapped in time.

In some aspects, SSBs of the set are mapped to REs in time and, subsequently, mapped in frequency.

Figure 16:
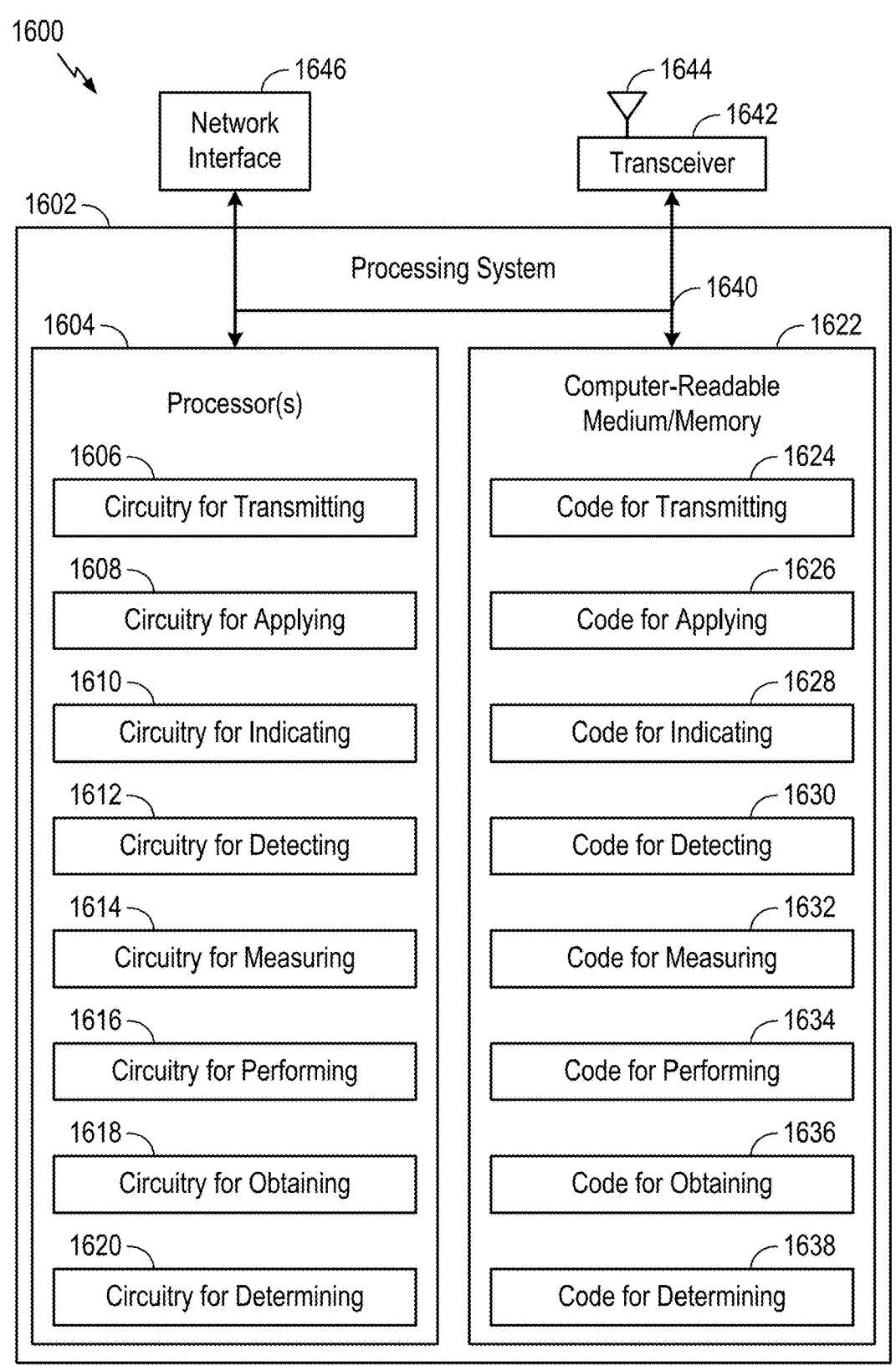
FIG. 16 depicts aspects of an example communications device.

In one aspect, method 1400, or any aspect related to it, may be performed by an apparatus, such as communications device 1600 of FIG. 16, which includes various components operable, configured, or adapted to perform the method 1400. Communications device 1600 is described below in further detail.

Note that FIG. 14 is just one example of a method, and other methods including fewer, additional, or alternative steps are possible consistent with this disclosure.

Figure 15:
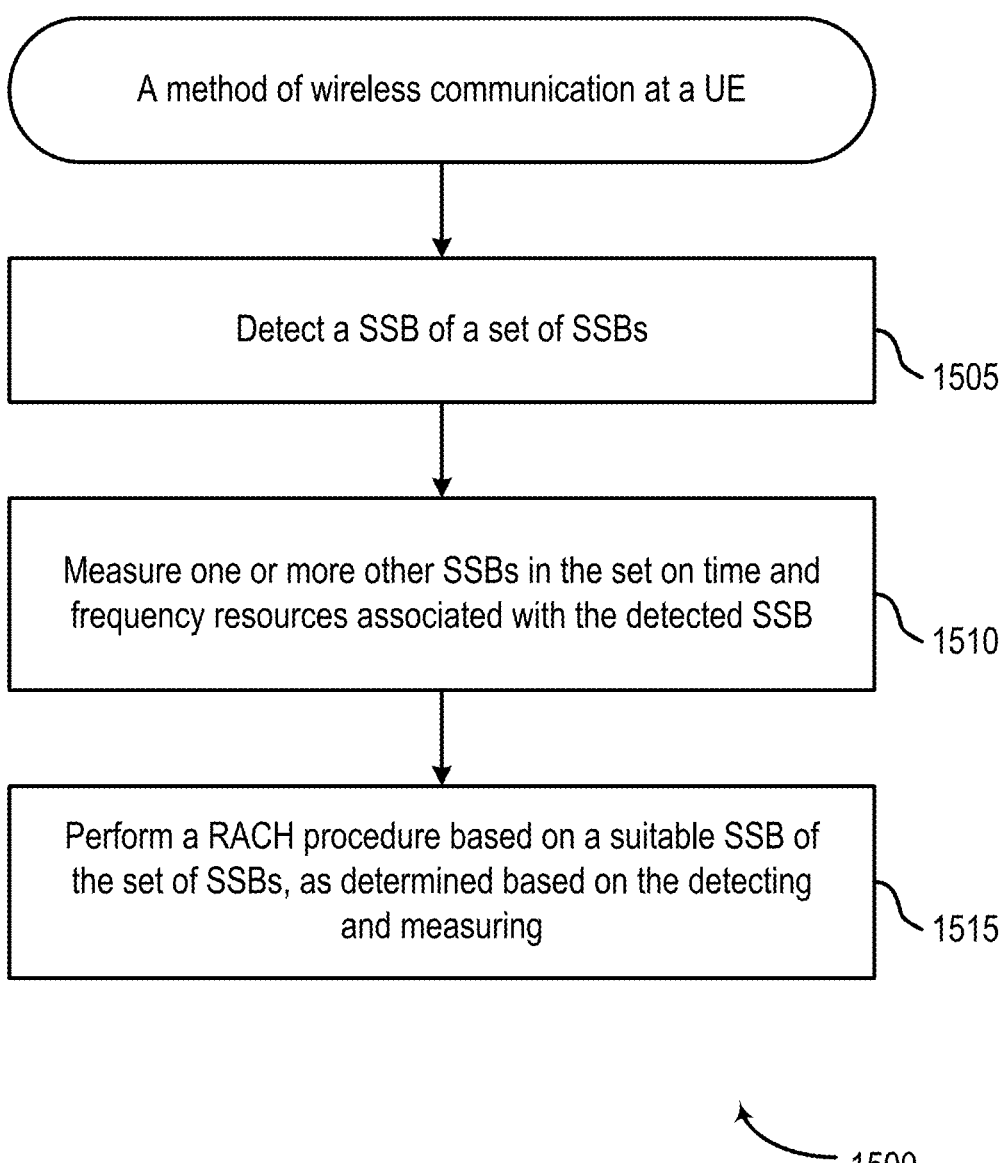
FIG. 15 depicts a method for wireless communications.

FIG. 15 shows an example of a method 1500 of wireless communication at a UE, such as a UE 104 of FIGS. 1 and 3.

Method 1500 begins at step 1505 with detecting a SSB of a set of SSBs. In some cases, the operations of this step refer to, or may be performed by, circuitry for detecting and/or code for detecting as described with reference to FIG. 16.

Method 1500 then proceeds to step 1510 with measuring one or more other SSBs in the set on time and frequency resources associated with the detected SSB. In some cases, the operations of this step refer to, or may be performed by, circuitry for measuring and/or code for measuring as described with reference to FIG. 16.

Method 1500 then proceeds to step 1515 with performing a RACH procedure based on a suitable SSB of the set of SSBs, as determined based on the detecting and measuring. In some cases, the operations of this step refer to, or may be performed by, circuitry for performing and/or code for performing as described with reference to FIG. 16.

In some aspects, time and frequency resources allocated to SSBs in the set are determined according to a multiplexing structure that: allocates time resources across different time periods to different subsets of SSBs in the set; and allocates frequency resources at different frequency positions within a time period to different SSBs within a subset.

In some aspects, a number of SSBs in a subset depends, at least in part, on a frequency range in which the set of SSBs is transmitted.

In some aspects, the method 1500 further includes obtaining, in one of the set of SSBs, an indication of a number of SSBs in a subset. In some cases, the operations of this step refer to, or may be performed by, circuitry for obtaining and/or code for obtaining as described with reference to FIG. 16.

In some aspects, the multiplexing structure assigns different frequency positions of one or more SSBs in a subset, based on one or more frequency offsets relative to a frequency position of at least one other SSB in the same subset.

In some aspects, values of the one or more frequency offsets depend, at least in part, on a frequency range in which the set of SSBs is transmitted.

In some aspects, the method 1500 further includes determining different frequency positions of SSBs in a subset according to a synchronization raster associated with the multiplexing structure. In some cases, the operations of this step refer to, or may be performed by, circuitry for determining and/or code for determining as described with reference to FIG. 16.

In some aspects, one or more characteristics of the synchronization raster depend, at least in part, on a number of SSBs in a subset; and the detecting results from searching for SSBs at different frequency locations based on the one or more characteristics.

In some aspects, the one or more characteristics comprise at least one of a range or step size of the synchronization raster.

In some aspects, the synchronization raster is mapped to one of the SSBs in a subset.

In some aspects, the multiplexing structure maps SSBs of the set to REs in frequency and, subsequently, mapped in time.

In some aspects, the multiplexing structure maps SSBs of the set to REs in time and, subsequently, mapped in frequency.

In one aspect, method 1500, or any aspect related to it, may be performed by an apparatus, such as communications device 1600 of FIG. 16, which includes various components operable, configured, or adapted to perform the method 1500. Communications device 1600 is described below in further detail.

Note that FIG. 15 is just one example of a method, and other methods including fewer, additional, or alternative steps are possible consistent with this disclosure.

Example Communications Device

FIG. 16 depicts aspects of an example communications device 1600. In some aspects, communications device 1600 is a user equipment, such as UE 104 described above with respect to FIGS. 1 and 3. In some aspects, communications device 1600 is a network entity, such as BS 102 of FIGS. 1 and 3, or a disaggregated base station as discussed with respect to FIG. 2.

The communications device 1600 includes a processing system 1602 coupled to the transceiver 1642 (e.g., a transmitter and/or a receiver). In some aspects (e.g., when communications device 1600 is a network entity), processing system 1602 may be coupled to a network interface 1646 that is configured to obtain and send signals for the communications device 1600 via communication link(s), such as a backhaul link, midhaul link, and/or fronthaul link as described herein, such as with respect to FIG. 2. The transceiver 1642 is configured to transmit and receive signals for the communications device 1600 via the antenna 1644, such as the various signals as described herein. The processing system 1602 may be configured to perform processing functions for the communications device 1600, including processing signals received and/or to be transmitted by the communications device 1600.

The processing system 1602 includes one or more processors 1604. In various aspects, the one or more processors 1604 may be representative of one or more of receive processor 358, transmit processor 364, TX MIMO processor 366, and/or controller/processor 380, as described with respect to FIG. 3. In various aspects, one or more processors 1604 may be representative of one or more of receive processor 338, transmit processor 320, TX MIMO processor 330, and/or controller/processor 340, as described with respect to FIG. 3. The one or more processors 1604 are coupled to a computer-readable medium/memory 1622 via a bus 1640. In certain aspects, the computer-readable medium/memory 1622 is configured to store instructions (e.g., computer-executable code) that when executed by the one or more processors 1604, cause the one or more processors 1604 to perform the method 1400 described with respect to FIG. 14, or any aspect related to it; and the method 1500 described with respect to FIG. 15, or any aspect related to it. Note that reference to a processor performing a function of communications device 1600 may include one or more processors 1604 performing that function of communications device 1600.

In the depicted example, computer-readable medium/ memory 1622 stores code (e.g., executable instructions), such as code for transmitting 1624, code for applying 1626, code for indicating 1628, code for detecting 1630, code for measuring 1632, code for performing 1634, code for obtaining 1636, and code for determining 1638. Processing of the code for transmitting 1624, code for applying 1626, code for indicating 1628, code for detecting 1630, code for measuring 1632, code for performing 1634, code for obtaining 1636, and code for determining 1638 may cause the communications device 1600 to perform the method 1400 described with respect to FIG. 14, or any aspect related to it; and the method 1500 described with respect to FIG. 15, or any aspect related to it.

The one or more processors 1604 include circuitry configured to implement (e.g., execute) the code stored in the computer-readable medium/memory 1622, including circuitry for transmitting 1606, circuitry for applying 1608, circuitry for indicating 1610, circuitry for detecting 1612, circuitry for measuring 1614, circuitry for performing 1616, circuitry for obtaining 1618, and circuitry for determining 1620. Processing with circuitry for transmitting 1606, circuitry for applying 1608, circuitry for indicating 1610, circuitry for detecting 1612, circuitry for measuring 1614, circuitry for performing 1616, circuitry for obtaining 1618, and circuitry for determining 1620 may cause the communications device 1600 to perform the method 1400 described with respect to FIG. 14, or any aspect related to it; and the method 1500 described with respect to FIG. 15, or any aspect related to it.

Various components of the communications device 1600 may provide means for performing the method 1400 described with respect to FIG. 14, or any aspect related to it; and the method 1500 described with respect to FIG. 15, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1642 and the antenna 1644 of the communications device 1600 in FIG. 16. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1642 and the antenna 1644 of the communications device 1600 in FIG. 16.

Example Clauses

Implementation examples are described in the following numbered clauses:

Clause 1: A method of wireless communication at a network entity, comprising: transmitting, in different time periods, different subsets of a set of SSBs, wherein SSBs within a subset are transmitted using frequency division multiplexing; and applying different spatial filtering to different SSBs of a subset transmitted in a same time period.

Clause 2: The method of Clause 1, wherein applying the different spatial filtering to different SSBs of a subset transmitted in a same time period comprises: applying different digital beamforming to the different SSBs of the subset in the same time period; and applying same analog beamforming to the different SSBs of the subset in the same period.

Clause 3: The method of Clause 2, further comprising: applying different analog beamforming in different time periods.

Clause 4: The method of any one of Clauses 1-3, wherein a number of SSBs in a subset depends, at least in part, on a frequency range in which the set of SSBs is transmitted.

Clause 5: The method of any one of Clauses 1-4, further comprising indicating, in one of the set of SSBs, a number of SSBs in a subset.

Clause 6: The method of any one of Clauses 1-5, wherein frequency positions of one or more SSBs in a subset are determined based on one or more frequency offsets relative to a frequency position of at least one other SSB in the same subset or a different subset.

Clause 7: The method of Clause 6, wherein values of the one or more frequency offsets depend, at least in part, on a frequency range in which the set of SSBs is transmitted.

Clause 8: The method of any one of Clauses 1-7, wherein different SSBs of a subset are transmitted, within a same time period, at frequency positions determined according to a synchronization raster.

Clause 9: The method of Clause 8, wherein one or more characteristics of the synchronization raster depend, at least in part, on a number of SSBs in a subset.

Clause 10: The method of Clause 9, wherein the one or more characteristics comprise at least one of a range or step size of the synchronization raster.

Clause 11: The method of Clause 8, wherein the synchronization raster is mapped to one of the SSBs in a subset.

Clause 12: The method of Clause 8, wherein SSBs of the set are mapped to REs in frequency and, subsequently, mapped in time.

Clause 13: The method of Clause 8, wherein SSBs of the set are mapped to REs in time and, subsequently, mapped in frequency.

Clause 14: A method of wireless communication at a UE, comprising: detecting a SSB of a set of SSBs; measuring one or more other SSBs in the set on time and frequency resources associated with the detected SSB; and performing a RACH procedure based on a suitable SSB of the set of SSBs, as determined based on the detecting and measuring.

Clause 15: The method of Clause 14, wherein time and frequency resources allocated to SSBs in the set are determined according to a multiplexing structure that: allocates time resources across different time periods to different subsets of SSBs in the set; and allocates frequency resources at different frequency positions within a time period to different SSBs within a subset.

Clause 16: The method of Clause 15, wherein a number of SSBs in a subset depends, at least in part, on a frequency range in which the set of SSBs is transmitted.

Clause 17: The method of Clause 15, further comprising obtaining, in one of the set of SSBs, an indication of a number of SSBs in a subset.

Clause 18: The method of Clause 15, wherein the multiplexing structure assigns different frequency positions of one or more SSBs in a subset, based on one or more frequency offsets relative to a frequency position of at least one other SSB in the same subset.

Clause 19: The method of Clause 18, wherein values of the one or more frequency offsets depend, at least in part, on a frequency range in which the set of SSBs is transmitted.

Clause 20: The method of Clause 15, further comprising determining different frequency positions of SSBs in a subset according to a synchronization raster associated with the multiplexing structure.

Clause 21: The method of Clause 20, wherein: one or more characteristics of the synchronization raster depend, at least in part, on a number of SSBs in a subset; and the detecting results from searching for SSBs at different frequency locations based on the one or more characteristics.

Clause 22: The method of Clause 21, wherein the one or more characteristics comprise at least one of a range or step size of the synchronization raster.

Clause 23: The method of Clause 20, wherein the synchronization raster is mapped to one of the SSBs in a subset.

Clause 24: The method of Clause 20, wherein the multiplexing structure maps SSBs of the set to REs in frequency and, subsequently, mapped in time.

Clause 25: The method of Clause 20, wherein the multiplexing structure maps SSBs of the set to REs in time and, subsequently, mapped in frequency.

Clause 26: An apparatus, comprising: a memory comprising executable instructions; and a processor configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by a processor of an apparatus, cause the apparatus to perform a method in accordance with any one of Clauses 1-25.

Clause 29: A computer program product embodied on a computer-readable storage medium comprising code for performing a method in accordance with any one of Clauses 1-25.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a network entity, comprising:
   transmitting, in different time periods, different subsets of a set of synchronization signal blocks (SSBs), wherein SSBs within a subset are transmitted using frequency division multiplexing;
   indicating, in one SSB of the set of SSBs, a number of SSBs in a subset; and applying different digital beamforming to different SSBs of a subset in the same time period and applying a same analog beamforming to the different SSBs of the subset in the same time period.

2. The method of claim 1, further comprising:

applying different analog beamforming in different time periods.

3. A method of wireless communication at a network entity, comprising:

transmitting, in different time periods, different subsets of a set of synchronization signal blocks (SSBs), wherein SSBs within a subset are transmitted using frequency division multiplexing;

indicating, in one SSB of the set of SSBs, a number of SSBs in a subset, wherein frequency positions of one or more SSBs in the subset are determined based on one or more frequency offsets relative to a frequency position of at least one other SSB in the same subset or a different subset; and applying different spatial filtering to different SSBs of a subset transmitted in a same time period.

4. The method of claim 3, wherein values of the one or more frequency offsets depend, at least in part, on a frequency range in which the set of SSBs is transmitted.

5. A method of wireless communication at a network entity, comprising:

transmitting, in different time periods, different subsets of a set of synchronization signal blocks (SSBs), wherein:

SSBs within a subset are transmitted using frequency division multiplexing, and different SSBs of a subset are transmitted, within a same time period, at frequency positions determined according to a synchronization raster; and applying different spatial filtering to different SSBs of a subset transmitted in a same time period.

6. The method of claim 5, wherein one or more characteristics of the synchronization raster depend, at least in part, on a number of SSBs in a subset.

7. The method of claim 6, wherein the one or more characteristics comprise at least one of a range or step size of the synchronization raster.

8. The method of claim 5, wherein the synchronization raster is mapped to one of the SSBs in a subset.

9. The method of claim 5, wherein SSBs of the set are mapped to resource elements (REs) in frequency and, subsequently, mapped in time.

10. The method of claim 5, wherein SSBs of the set are mapped to resource elements (REs) in time and, subsequently, mapped in frequency.

11. A network entity configured for wireless communication, comprising:

memory comprising processor-executable instructions; and one or more processors configured to execute the processor-executable instructions and cause the network entity to:

transmit, in different time periods, different subsets of a set of synchronization signal blocks (SSBs), wherein SSBs within a subset are transmitted using frequency division multiplexing;

indicate, in one SSB of the set of SSBs, a number of SSBs in a subset; and apply different digital beamforming to different SSBs of a subset in the same time period and applying a same analog beamforming to the different SSBs of the subset in the same time period.

12. A network entity configured for wireless communication, comprising:

memory comprising processor-executable instructions; and one or more processors configured to execute the processor-executable instructions and cause the network entity to:

transmitting, in different time periods, different subsets of a set of synchronization signal blocks (SSBs), wherein:

SSBs within a subset are transmitted using frequency division multiplexing, and different SSBs of a subset are transmitted, within a same time period, at frequency positions determined according to a synchronization raster; and applying different spatial filtering to different SSBs of a subset transmitted in a same time period.

13. The network entity of claim 12, wherein different SSBs of a subset are transmitted, within a same time period, at frequency positions determined according to a synchronization raster.

14. The network entity of claim 13, wherein one or more characteristics of the synchronization raster depend, at least in part, on a number of SSBs in a subset.

15. The network entity of claim 14, wherein the one or more characteristics comprise at least one of a range or step size of the synchronization raster.

16. The network entity of claim 13, wherein the synchronization raster is mapped to one of the SSBs in a subset.

17. The network entity of claim 13, wherein SSBs of the set are mapped to resource elements (REs) in frequency and, subsequently, mapped in time.

18. The network entity of claim 13, wherein SSBs of the set are mapped to resource elements (REs) in time and, subsequently, mapped in frequency.

* * * * *